(12) United States Patent
Terterov et al.

(10) Patent No.: US 10,986,363 B2
(45) Date of Patent: Apr. 20, 2021

(54) METHOD OF PRE-PROCESSING OF VIDEO INFORMATION FOR OPTIMIZED VIDEO ENCODING

(71) Applicant: BEAMR IMAGING LTD., Herzeliya Pituach (IL)

(72) Inventors: Mikhail Terterov, St. Petersburg (RU); Alexey Martemyanov, St. Petersburg (RU); Boris Filippov, St. Petersburg (RU); Tamar Shoham, Netanya (IL)

(73) Assignee: BEAMR IMAGING LTD., Herzeliya Pituach (IL)

( * ) Notice: Subject to any disclaimer, the term of this patent is extended or adjusted under 35 U.S.C. 154(b) by 27 days.

(21) Appl. No.: 16/333,279

(22) PCT Filed: Sep. 5, 2017

(86) PCT No.: PCT/IL2017/050995
§ 371 (c)(1),
(2) Date: Mar. 14, 2019

(87) PCT Pub. No.: WO2018/051330
PCT Pub. Date: Mar. 22, 2018

(65) Prior Publication Data
US 2019/0246138 A1    Aug. 8, 2019

Related U.S. Application Data

(60) Provisional application No. 62/394,933, filed on Sep. 15, 2016, provisional application No. 62/394,373, filed on Sep. 14, 2016.

(51) Int. Cl.
*H04N 19/52*    (2014.01)
*H04N 19/513*    (2014.01)
(Continued)

(52) U.S. Cl.
CPC ............. *H04N 19/521* (2014.11); *H04N 5/21* (2013.01); *H04N 5/23267* (2013.01);
(Continued)

(58) Field of Classification Search
CPC .. H04N 19/521; H04N 19/137; H04N 19/117; H04N 19/14; H04N 5/21;
(Continued)

(56) References Cited

U.S. PATENT DOCUMENTS 8,160,160 B2    4/2012    Blum
8,199,810 B2    6/2012    Mabey et al.
(Continued)

FOREIGN PATENT DOCUMENTS

WO    2013/144942 A1    10/2013
WO    2016/060672 A1    4/2016
(Continued)

OTHER PUBLICATIONS

Bhagavathy, et al., Adaptive Spatio-Temporal Video Noise Filtering for High Quality Application, 2007 IEEE International Conference on Acoustics, Speech and Signal Processing—ICASSP'07, 2007, pp. 1-4, vol. 1.
(Continued)

*Primary Examiner* — Yogesh K Aggarwal
(74) *Attorney, Agent, or Firm* — Browdy and Neimark, PLLC

(57) ABSTRACT

There are provided computerized systems and methods of pre-processing video information for optimized video encoding. In various aspects, the pre-processing can be performed in different ways. By way of example, this can be performed by aligning a plurality of consecutive frames in the sequence of video frames. By way of another example, this can be performed by conducting adaptive pre-filtering of the video information. By way of yet another example, this
(Continued)

can be performed by filtering the video information in order to remove grain content thereof.

30 Claims, 7 Drawing Sheets

(51) Int. Cl.
*H04N 19/86* (2014.01)
*H04N 19/137* (2014.01)
*H04N 19/117* (2014.01)
*H04N 19/14* (2014.01)
*H04N 5/21* (2006.01)
*H04N 19/172* (2014.01)
*H04N 19/174* (2014.01)
*H04N 19/523* (2014.01)
*H04N 5/232* (2006.01)

(52) U.S. Cl.
CPC ......... *H04N 19/117* (2014.11); *H04N 19/137* (2014.11); *H04N 19/14* (2014.11); *H04N 19/172* (2014.11); *H04N 19/174* (2014.11); *H04N 19/52* (2014.11); *H04N 19/523* (2014.11); *H04N 19/86* (2014.11)

(58) Field of Classification Search
CPC .... H04N 19/172; H04N 19/174; H04N 19/52; H04N 19/523; H04N 5/23267; H04N 19/86
See application file for complete search history.

(56) References Cited

U.S. PATENT DOCUMENTS

| | | | |
|---|---|---|---|
| 2004/0170330 A1* | 9/2004 | Fogg | G09G 3/20 382/232 |
| 2007/0230914 A1* | 10/2007 | Garrido | H04N 19/30 386/264 |
| 2008/0192822 A1* | 8/2008 | Chang | H04N 19/172 375/240.03 |
| 2010/0026897 A1* | 2/2010 | Sharlet | H04N 5/213 348/607 |
| 2013/0003872 A1 | 1/2013 | Alvarez et al. | |

FOREIGN PATENT DOCUMENTS

| | | |
|---|---|---|
| WO | 2016/120871 A1 | 8/2016 |
| WO | 2016/142931 A1 | 9/2016 |
| WO | 2017/085708 A1 | 5/2017 |

OTHER PUBLICATIONS

Dai, et al., Film grain noise removal and synthesis in video coding, 2010 IEEE International Conference on Acoustics, Speech and Signal Processing, 2010, pp. 1-5.

Digalakis, Vassilios V., The Three-Dimensional Linear Prediction and Its Application to Digital Angiography, Multidimensional Systems and Signal Processing, 1993, pp. 307-329, vol. 4.

Guo, et al., Temporal Video Denoising Based on Multihypothesis Motion Compensation, IEEE Transacations on Circuits and Systems for Video Technology, Oct. 2007, pp. 1423-1429, vol. 17, No. 10.

Hamza, et al., Unifying Probabilistic and Variational Estimation, IEEE Signal Processing Magazine, Sep. 2002, pp. 37-47.

Harel, et al., Graph-Based Visual Saliency, In Advances in neural information processing systems, 2007, pp. 545-552.

Hepper, Dietmar, Investigating Properties of Film Grain Noise for Film Grain Management, 2013 IEEE Third International Conference on Consumer Electronic—Berlin (ICCE Berlin), 2013, pp. 1-4.

Hawang, et al., Enhanced Film Grain Noise Removal for High Fidelity Video Coding, 2013 International Conferences on Information Science and Cloud Computing Companion, 2013, pp. 1-7.

Oh, et al., Advanced Film Grain Noise Extraction and Synthesis for High-Definition Video Coding, IEEE Transactions on Circuits and Systems for Video Technology, Dec. 2009, pp. 1717-1729, vol. 19, No. 12.

Rudin, et al., Nonlinear total variation based noise removal algorithms, Physica D, 1992, pp. 259-268, vol. 60.

Thevenaz, et al., Bi-Exponential Edge-Preserving Smoother, IEEE Transactions on Image Processing, Sep. 2012, pp. 3924-3936, vol. 21, No. 9.

Vitale, Tim, Film Grain, Resolution and Fundamental Film Particles, 2007, pp. 1-26.

* cited by examiner

METHOD OF PRE-PROCESSING OF VIDEO INFORMATION FOR OPTIMIZED VIDEO ENCODING

TECHNICAL FIELD

The presently disclosed subject matter relates generally to the field of compression of video information, and more specifically, to methods and systems of pre-processing video information for video encoding.

BACKGROUND

The compression of video information (including, in particular, digital video information) comprises a well-known area of prior art endeavor. Generally speaking, video information compression results in a reduced set of data that consumes less memory when stored and that requires less bandwidth to transmit during a given period of time. Also, generally speaking, one goal of good compression methodologies is to achieve such benefits without unduly impacting the user's perception of quality when viewing the decompressed video image.

Modern video compression methodologies, such as Advanced Video Coding (AVC), also known as H.264, or High Efficiency Video Coding (HEVC), also known as H.265 and MPEG-H Part 2, achieve relatively high compression rates while maintaining/retaining good video quality. That said, such compression techniques can be computationally intensive. As a result, some implementing platforms may operate at a technical disadvantage due, for example, to the power-consumption requirements and/or computational requirements that attend the proper processing of such compression techniques. Perhaps more importantly, existing prior art approaches tend to require a particular bitrate level to achieve a particular level of perceived video quality, this bit rate being higher than is desired for many application settings.

GENERAL DESCRIPTION

In accordance with certain aspects of the presently disclosed subject matter, there is provided a computerized method of pre-processing video information for optimized video encoding, the method comprising: receiving, by an I/O interface, video information to be encoded, the video information comprising a sequence of video frames; aligning, by a control circuit, a plurality of consecutive frames in the sequence of video frames by spatially shifting at least one frame of the plurality of consecutive frames, giving rise to a pre-processed sequence of video frames including the aligned plurality of consecutive frames; and encoding, by the control circuit, the pre-processed sequence of video frames using block-based motion estimation, wherein the block-based motion estimation is optimized by using the pre-processed video information.

In addition to the above features, the method according to this aspect of the presently disclosed subject matter can comprise one or more of features (i) to (vii) listed below, in any desired combination or permutation which is technically possible:

(i). The aligning can comprise detecting non-uniform camera movements of the plurality of consecutive frames, determining a camera movement value representative of the non-uniform camera movements and spatially shifting the at least one frame using the camera movement value.

(ii). The non-uniform camera movements can be along a direction of camera movement.

(iii). The non-uniform camera movements can be with respect to a center position of at least a portion of each of the plurality of consecutive frames.

(iv). The determining can comprise determining the camera movement value based on an average of the non-uniform camera movements.

(v). The shifting can be performed in a pixel or sub-pixel granularity.

(vi). The aligning can comprise aligning the plurality of consecutive frames along a sub-pixel grid that corresponds to an encoding scheme used in the encoding.

(vii). The aligning can comprise:
estimating high resolution sub-pixel motion in the at least one frame; and
shifting the at least one frame in accordance with the estimated high resolution sub-pixel motion such that the at least one frame aligns with the sub-pixel grid.

In accordance with another aspect of the presently disclosed subject matter, there is provided a computerized system of pre-processing video information for optimized video encoding, the system comprising: an I/O interface configured to receive video information to be encoded, the video information comprising a sequence of video frames; a control circuitry operatively connected to the I/O interface, the control circuitry comprising a processor and a memory coupled thereto and configured to: align a plurality of consecutive frames in the sequence of video frames by spatially shifting at least one frame of the plurality of consecutive frames, giving rise to a pre-processed sequence of video frames including the aligned plurality of consecutive frames; and encode the pre-processed sequence of video frames using block-based motion estimation, wherein the block-based motion estimation is optimized by using the pre-processed video information.

This aspect of the disclosed subject matter can comprise one or more of features (i) to (vii) listed above with respect to the method, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of pre-processing video information for optimized video encoding, the method comprising: receiving video information to be encoded, the video information comprising a sequence of video frames; aligning a plurality of consecutive frames in the sequence of video frames by spatially shifting at least one frame of the plurality of consecutive frames, giving rise to a pre-processed sequence of video frames including the aligned plurality of consecutive frames; and encoding the pre-processed sequence of video frames using block-based motion estimation, wherein the block-based motion estimation is optimized by using the pre-processed video information.

This aspect of the disclosed subject matter can comprise one or more of features (i) to (vii) listed above with respect to the method, mutatis mutandis, in any desired combination or permutation which is technically possible.

In accordance with certain aspects of the presently disclosed subject matter, there is provided a computerized method of pre-processing video information for optimized video encoding, the method comprising: pre-processing video information for optimized video encoding, the method comprising: receiving, by an I/O interface, video information to be encoded, the video information comprising a sequence of video frames; conducting, by a control circuit, adaptive pre-filtering of the video information, giving rise to pre-processed video information, wherein the conducting comprises, for each given frame of the sequence of video frames: estimating encoding complexity for one or more blocks in the given frame, the encoding complexity indicative of difference between pixels in the one or more blocks and corresponding prediction of the pixels; determining a filter strength parameter for the given frame at least based on the encoding complexity; and filtering the given frame using the filter strength parameter, giving rise to a filtered frame; thereby obtaining a sequence of filtered frames constituting the pre-processed video information; and encoding, by the control circuit, the pre-processed video information.

In addition to the above features, the method according to this aspect of the presently disclosed subject matter can comprise one or more of features (a) to (d) listed below, in any desired combination or permutation which is technically possible:

a. The conducting can further comprise, for each given frame: generating a saliency map for at least a portion of the given frame, the saliency map indicative of one or more areas in the at least a portion each associated with a degree of visual importance; and the filtering can comprise: adaptively filtering the given frame according to the saliency map using the filter strength parameter.

b. The determining can comprise determining the filter strength parameter using a linear model based on one or more video characteristics of the video information selected from a group comprising: the encoding complexity, bitrate, frame rate, and frame resolution.

c. The determining can comprise determining the filter strength parameter using a machine learning model based on one or more video characteristics of the video information selected from a group comprising: the encoding complexity, bitrate, frame rate, and frame resolution.

d. The generating can comprise extracting one or more features characterizing the given frame, the one or more features selected from a group comprising: intricateness, gradient, smoothness, grain, face, skin, chroma, level of photo-realism, luminance, and motion of the given frame, and generating the saliency map using the one or more features.

In accordance with another aspect of the presently disclosed subject matter, there is provided a computerized system of pre-processing video information for optimized video encoding, the system comprising: an I/O interface configured to receive video information to be encoded, the video information comprising a sequence of video frames; a control circuitry operatively connected to the I/O interface, the control circuitry comprising a processor and a memory coupled thereto and configured to: conduct adaptive pre-filtering of the video information, giving rise to pre-processed video information, wherein the conducting comprises, for each given frame of the sequence of video frames: estimating encoding complexity for one or more blocks in the given frame, the encoding complexity indicative of difference between pixels in the one or more blocks and corresponding prediction of the pixels; determining a filter strength parameter for the given frame at least based on the encoding complexity; and filtering the given frame using the filter strength parameter, giving rise to a filtered frame; thereby obtaining a sequence of filtered frames constituting the pre-processed video information; and encode the pre-processed video information.

This aspect of the disclosed subject matter can comprise one or more of features (a) to (d) listed above with respect to the method, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of pre-processing video information for optimized video encoding, the method comprising: pre-processing video information for optimized video encoding, the method comprising: receiving video information to be encoded, the video information comprising a sequence of video frames; conducting adaptive pre-filtering of the video information, giving rise to pre-processed video information, wherein the conducting comprises, for each given frame of the sequence of video frames: estimating encoding complexity for one or more blocks in the given frame, the encoding complexity indicative of difference between pixels in the one or more blocks and corresponding prediction of the pixels; determining a filter strength parameter for the given frame at least based on the encoding complexity; and filtering the given frame using the filter strength parameter, giving rise to a filtered frame; thereby obtaining a sequence of filtered frames constituting the pre-processed video information; and encoding the pre-processed video information.

This aspect of the disclosed subject matter can comprise one or more of features (a) to (d) listed above with respect to the method, mutatis mutandis, in any desired combination or permutation which is technically possible.

In accordance with certain aspects of the presently disclosed subject matter, there is provided a computerized method of pre-processing video information for optimized video encoding, the method comprising: receiving, by an I/O interface, video information to be encoded, the video information comprising a sequence of video frames; filtering, by a control circuit, the video information in order to remove grain content thereof, giving rise to pre-processed video information, wherein the filtering comprises, for each given frame of the sequence of video frames: obtaining temporal prediction information for the given frame; detecting areas in the given frame with bad temporal prediction using the temporal prediction information and excluding the detected areas from the given frame, giving rise to a remaining frame area; performing a temporal filtration on the remaining frame area, giving rise to a temporal filtered frame; performing a spatial filtration on the temporal filtered frame, giving rise to a grain filtered frame; thereby obtaining a sequence of grain filtered frames constituting the pre-processed video information; and encoding, by the control circuit, the pre-processed video information.

In addition to the above features, the method according to this aspect of the presently disclosed subject matter can comprise one or more of features (1) to (10) listed below, in any desired combination or permutation which is technically possible:

1) The temporal filtration can be performed by: calculating a filtered pixel value for each given pixel in the remaining frame area based on a weighted summation of pixel values of the given pixel in the remaining frame area and at least one corresponding pixel in at least one motion estimated frame of the given frame, giving rise to the temporal filtered frame.

2) The detecting areas in the given frame with bad temporal prediction can be configured using one or more grain strength values associated with the given frame.
3) Performing spatial filtration can be configured based on one or more grain strength values associated with the given frame.
4) The filtering can further comprise calculating the one or more grain strength values associated with the given frame, comprising: splitting the given frame into one or more luminance intervals based on pixel values thereof; and calculating a grain strength value for each given luminance interval based on variance of blocks within the given interval, giving rise to one or more grain strength values corresponding to the one or more luminance intervals.
5) The detecting areas can be configured by setting at least one detection threshold to be used to detect areas with bad temporal prediction based on the one or more grain strength values.
6) The detecting can comprise: calculating absolute summation between the given frame and a motion-compensated frame thereof on a per block basis; comparing the absolute summation with at least one detection threshold; and identifying, based on the comparison, one or more poorly predicted blocks to be the areas with bad temporal prediction.
7) The calculating an absolute summation can comprise: calculating difference values between pixels of the given frame and a motion-compensated frame thereof, giving rise to a residual frame; splitting the residual frame into a plurality of blocks; and calculating an absolute summation for each given block in the residual frame.
8) The absolute summation can be a sum of absolute difference values within the given block.
9) The absolute summation can be the absolute of sum of difference values within the given block.
10) The performing of spatial filtration can be further configured by setting one or more following parameters used in the spatial filtration: filter size, filter strength, and edge related parameters.

In accordance with another aspect of the presently disclosed subject matter, there is provided a computerized system of pre-processing video information for optimized video encoding, the system comprising: an I/O interface configured to receive video information to be encoded, the video information comprising a sequence of video frames; a control circuitry operatively connected to the I/O interface, the control circuitry comprising a processor and a memory coupled thereto and configured to: filter the video information in order to remove grain content thereof, giving rise to pre-processed video information, wherein the filtering comprises, for each given frame of the sequence of video frames: obtaining temporal prediction information for the given frame; detecting areas in the given frame with bad temporal prediction using the temporal prediction information and excluding the detected areas from the given frame, giving rise to a remaining frame area; performing a temporal filtration on the remaining frame area, giving rise to a temporal filtered frame; and performing a spatial filtration on the temporal filtered frame, giving rise to a grain filtered frame; thereby obtaining a sequence of grain filtered frames constituting the pre-processed video information; and encode the pre-processed video information.

This aspect of the disclosed subject matter can comprise one or more of features (1) to (10) listed above with respect to the method, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of pre-processing video information for optimized video encoding, the method comprising: receiving video information to be encoded, the video information comprising a sequence of video frames; filtering the video information in order to remove grain content thereof, giving rise to pre-processed video information, wherein the filtering comprises, for each given frame of the sequence of video frames: obtaining temporal prediction information for the given frame; detecting areas in the given frame with bad temporal prediction using the temporal prediction information and excluding the detected areas from the given frame, giving rise to a remaining frame area; performing a temporal filtration on the remaining frame area, giving rise to a temporal filtered frame; performing a spatial filtration on the temporal filtered frame, giving rise to a grain filtered frame; thereby obtaining a sequence of grain filtered frames constituting the pre-processed video information; and encoding the pre-processed video information.

This aspect of the disclosed subject matter can comprise one or more of features (1) to (10) listed above with respect to the method, mutatis mutandis, in any desired combination or permutation which is technically possible.

BRIEF DESCRIPTION OF THE DRAWINGS

The above needs are at least partially met through provision of the apparatus and method for pre-compression pre-processing of video information described in the following detailed description, particularly when studied in conjunction with the drawings.

In order to understand the presently disclosed subject matter and to see how it may be carried out in practice, embodiments will now be described, by way of non-limiting example only, with reference to the accompanying drawings, in which.

Figure 1:
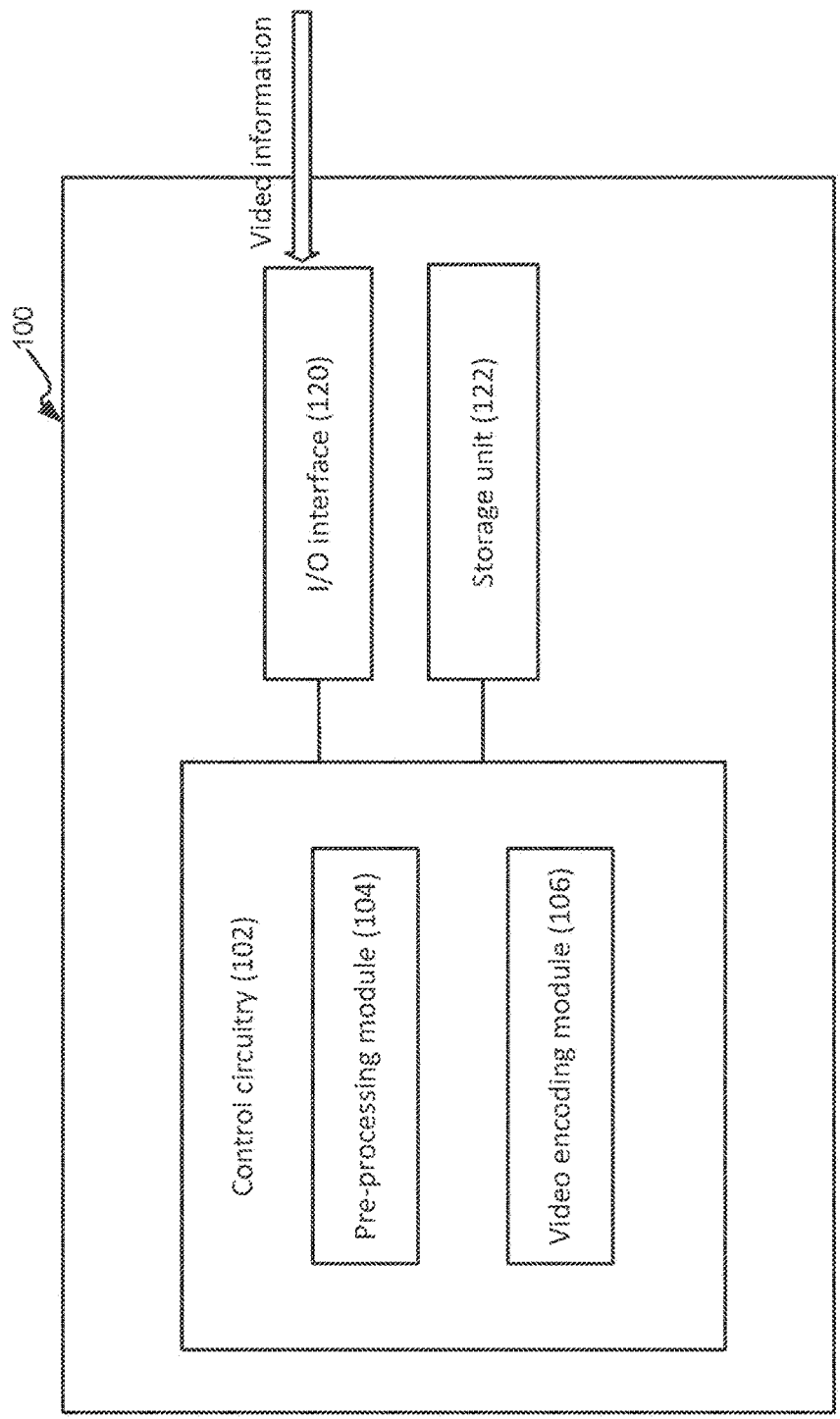
FIG. 1 illustrates a block diagram of a computerized system of pre-processing video information for optimized video encoding in accordance with certain embodiments of the presently disclosed subject matter.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have their ordinary technical meaning as are accorded to such terms and expressions by persons skilled in the technical field as set forth above, except where different specific meanings have otherwise been set forth herein.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "encoding", "pre-processing", "aligning", "shifting", "detecting", "determining", "estimating", "conducting", "filtering", "obtaining", "generating", "using", "extracting", "performing", "excluding", "calculating", "splitting", "setting", "comparing", "identifying" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system/apparatus and parts thereof as well as the processing circuit/circuitry and control circuit/circuitry therein disclosed in the present application.

The terms "non-transitory memory" and "non-transitory storage medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Generally speaking, pursuant to these various embodiments, an apparatus has an input configured to receive video information and an output configured to provide pre-processed video information to be compressed by a video encoder. The apparatus includes a control circuit operably coupled to the foregoing input and output and configured to pre-process the video information by adjusting alignment of at least some consecutive frames of the video information.

By one approach, the control circuit detects non-uniform camera movements along the direction of camera movement in the video information. In lieu of the foregoing or in combination therewith the control circuit may also detect non-uniform camera movements with respect to frame center positions. In any event, by one approach the control circuit adjusts the alignment of at least some consecutive frames of the video information by, at least in part, determining a representative camera movement value and then using that value in place of the non-uniform camera movements for the aforementioned consecutive frames. If desired, the foregoing activity can include determining an average of the non-uniform camera movements over a plurality of consecutive frames of the video information.

By another approach, in lieu of the foregoing or in combination therewith, the control circuit pre-processes the video information by adjusting alignment of at least some consecutive frames of the video information by, at least in part, aligning movements along a sub-pixel grid that corresponds to the video encoder that receives the pre-processed video information. This alignment can comprise, for example, estimating high resolution sub-pixel motion in at least one video frame and shifting that video frame so that the motion aligns with the aforementioned sub-pixel grid.

By one approach the control circuit can be further configured to conduct adaptive pre-filtering of the video information by, at least in part, determining a filter strength parameter based at least in part on video complexity of the video information and then using that filter strength parameter to selectively filter portions of the video information according to a degree of salience as corresponds to relevant frames of video information. If desired, the control circuit can also be configured to generate a saliency map for at least portions of the video information that highlights portions of the video information having high saliency.

By yet another approach the control circuit can be further configured to remove grain from the video information by using combined spatial and temporal filtration, wherein the control circuit is further configured to detect areas in the video information with bad temporal prediction such that the control circuit excludes those detected areas from the temporal filtration. Detecting areas with bad temporal prediction can include, for example, calculating a sum of absolute differences between current and motion-compensated frames (for example, on a per-block basis). If desired, the grain removal activity can further comprise selecting at least one grain filter parameter from a look-up table as a function, at least in part, of grain variance of the video information.

Using one or more of the aforementioned techniques, video information can be pre-processed in a way that can greatly reduce the computational and/or bitrate requirements of the follow-on compression activity. In particular, many prior art compression methodologies, including the recent HEVC standard, can be carried out in a considerably more efficient and less computationally-intensive manner. As a result, use of these teachings can reduce power requirements and/or can reduce the computational overhead requirements of the implementing encoder hardware while also possibly reducing the necessary bitrate. More importantly, these teachings permit a lower bitrate to be utilized than previous approaches while maintaining at least a similar level of perceptible quality and can also achieve a higher level of perceptible quality at a given bitrate than existing approaches. These and other benefits may become clearer upon making a thorough review and study of the following detailed description.

Referring now to the drawings, FIG. 1 illustrates a block diagram of a computerized system of pre-processing video information for optimized video encoding in accordance with certain embodiments of the presently disclosed subject matter.

There is presented an enabling computer-based apparatus/system 100 configured to pre-process video information to be encoded. The term "video encoding" used in this patent specification should be expansively construed to cover any kind of video compression that converts raw (i.e., uncompressed) digital video to a compressed format, as well as video recompression that converts decoded or decompressed video to a re-encoded or recompressed format.

System 100 can comprise a control circuitry (also termed herein as control circuit or processing circuitry) 102 operatively connected to a hardware-based I/O interface 120 and a storage unit 122. The system 100 may obtain, e.g., via I/O interface 120, video information to be encoded, the video information comprising a sequence of video frames (also termed herein as frames or input frames). In some embodiments, the input video information or the video frames thereof can be received from a user, a third party provider or any other system that is communicatively connected with system 100. Alternatively or additionally, the input video information or the video frames thereof can be pre-stored in the storage unit 122.

The control circuitry 102 is configured to provide all processing necessary for operating system 100 which is further detailed with reference to FIGS. 2-4. The control circuitry 102 refers to hardware (e.g., an electronic circuit) within a computer that executes a program. The control circuitry 102 can comprise a processor (not shown separately) and a memory (not shown separately). The processor of control circuitry 102 can be configured to execute several functional modules in accordance with computer-readable instructions implemented on a non-transitory computer-readable memory comprised in the processing circuitry. Such functional modules are referred to hereinafter as comprised in the processing circuitry.

According to certain embodiments, being a "circuit" or "circuitry", the control circuitry 102 therefore can comprise a structure that includes at least one (and typically many) electrically-conductive paths (such as, e.g., paths comprised of a conductive metal such as copper or silver) that convey electricity in an ordered manner, whose path(s) will also typically include corresponding electrical components (both passive, such as, e.g., resistors and capacitors, and active, such as, e.g., any of a variety of semiconductor-based devices as appropriate) to permit the circuit to effect the control aspect of these teachings.

Such a control circuitry 102 can comprise a fixed-purpose hard-wired hardware platform (including but not limited to, e.g., an application-specific integrated circuit (ASIC) which is an integrated circuit that is customized by design for a particular use, rather than intended for general-purpose use, a field-programmable gate array (FPGA), and the like) or can comprise a partially or wholly-programmable hardware platform (including but not limited to, e.g., microcontrollers, microprocessors, and the like). If desired, the control circuitry 102 can comprise an integral part of a dedicated video encoder integrated circuit which can implement the functionalities of the functional module video encoding module 106, as will be described below. These architectural options for such structures are well known and understood in the art and require no further description here. The control circuitry 102 can be configured (for example, by using corresponding programming as will be well understood by those skilled in the art) to carry out one or more of the steps, actions, and/or functions described herein with reference to FIGS. 2-4.

As aforementioned, the control circuitry 102 can comprise a processor and a memory. By one approach the control circuitry 102 can be operably coupled to the memory. This memory may be integral to the control circuitry or can be physically discrete (in whole or in part) from the control circuitry as desired. This memory can also be local with respect to the control circuitry (where, for example, both share a common circuit board, chassis, power supply, and/or housing) or can be partially or wholly remote with respect to the control circuitry (where, for example, the memory is physically located in another facility, metropolitan area, or even country as compared to the control circuitry).

In addition to other useful information described herein, this memory can serve, for example, to non-transitorily store the computer instructions that, when executed by the control circuitry, cause the control circuitry to behave as described herein. As used herein, the reference to "non-transitorily" will be understood to refer to a non-ephemeral state for the stored contents (and hence excludes when the stored contents merely constitute signals or waves) rather than volatility of the storage media itself and hence includes both non-volatile memory (such as e.g., read-only memory (ROM)) as well as volatile memory (such as, e.g., an erasable programmable read-only memory (EPROM)).

As aforementioned, the I/O interface 120 (also referred to herein separately as input interface and output interface or input and output) is operably coupled to the control circuitry 102 and is configured to receive video information to be encoded, the video information comprising a sequence of video frames.

The teachings herein will accommodate receiving video information in any of a wide variety of formats. In a typical application setting, the video information can constitute digital content. By one approach, if desired, the original video content can have an analog format and can then be converted to a digital format to constitute the video information.

As noted above, the received video information is "to be compressed" (in this case by the video encoding module 106 as will be described below). By one approach the video information refers to any original video content that has not been compressed in any way, aside from some optional inherent compression that might occur during the digitization process, such as, e.g., an original raw video clip or part thereof. Such a video clip can comprise a plurality of original video frames, and can be obtained from, e.g., a digital camera or recorder, or any other suitable devices that are capable of capturing or recording individual still images or sequences of images constituting videos or movies. By another approach, the video information may already have undergone some compression but, if so, is still nevertheless to be compressed again via the video encoding module 106. In such cases, video bit-stream that contains encoded data can be first decoded or reconstructed to a decoded video sequence prior to being further processed using the present disclosure. The input video information can comprise the decoded or reconstructed video sequence which was decoded from the encoded video bit-stream. In this case, the compression refers to recompression of the video information. Without limiting the scope of the disclosure in any way, it should be noted that the term "frame" used in the specification should be expansively construed to include a single video picture, frame, image, field, or slice of the input video sequence.

According to certain embodiments, functional modules comprised in the processor of the control circuitry 102 can comprise a pre-processing module 104 and a video encoding module (also termed herein as video encoder) 106 which are operatively connected with each other. The pre-processing module 104 can be configured to pre-process the video information in various ways as described below with respect to FIGS. 2-4. The teachings in FIGS. 2-4 can be implemented by the pre-processing module 104 either separately in different embodiments, or in any appropriate combination thereof. For example, the pre-processing module 104 can be configured to pre-process the video information by aligning a plurality of consecutive frames, as described with reference to FIG. 2, and/or by conducting adaptive pre-filtering of the video information, as described with reference to FIG. 3, and/or filtering the video information in order to remove grain content thereof as described with reference to FIG. 4. The video encoding module 106 can be configured to encode the pre-processed video information. As aforementioned, by using the pre-processed video information instead of the unprocessed video information, it can greatly reduce the computational and/or bitrate requirements of the follow-on encoding operation, thereby enabling a considerably more efficient and less computationally-intensive video encoding.

Those skilled in the art will be familiar with a wide variety of video encoders and compression techniques. As the present teachings are not especially sensitive to any particular choices in this regard, no further elaboration is provided here.

The Storage unit 122 comprises a non-transitory computer readable storage medium. For instance, the storage module can include a buffer that holds the input video information as well as an output video sequence. In another example, the buffer may also hold one or more of the intermediate results including: pre-processed video information, filtered frames etc. According to certain embodiments, the Storage unit 122 can also comprise computer-readable instructions embodied therein to be executed by the control circuitry 102 for implementing the process of pre-processing video information as described below with reference to FIGS. 2-4.

Those versed in the art will readily appreciate that the teachings of the presently disclosed subject matter are not bound by the system illustrated in FIG. 1 and the above exemplified implementations. Equivalent and/or modified functionality can be consolidated or divided in another manner and can be implemented in any appropriate combination of software, firmware and hardware. By way of example, the functionalities of the Video encoding module 106 as described herein can be divided and implemented as separate modules operatively connected to system 100. For instance, the Video encoding module 106 can be either implemented as integrated within the control circuitry, or alternatively as a separate module operatively in connection with the control circuitry.

The system in FIG. 1 can be a standalone network entity, or integrated, fully or partly, with other network entities. Those skilled in the art will also readily appreciate that the storage unit and/or therein can be shared with other systems or be provided by other systems, including third party equipment.

It is also noted that the system illustrated in FIG. 1 can be implemented in a distributed computing environment, in which the aforementioned functional modules shown in FIG. 1 can be distributed over several local and/or remote devices, and can be linked through a communication network.

Figure 2:
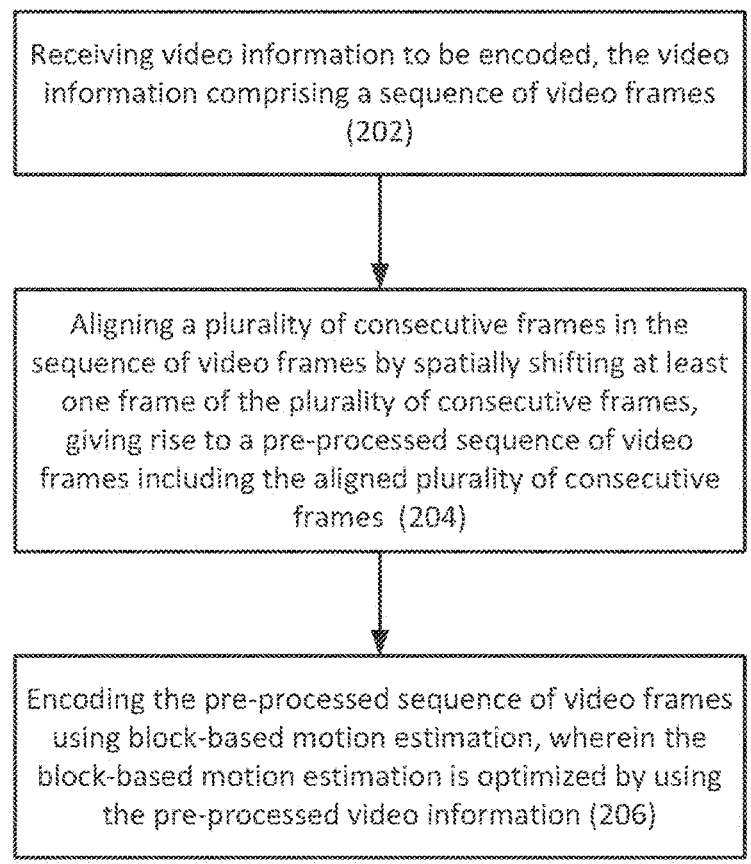
FIG. 2 illustrates a generalized flowchart of pre-processing video information for optimized video encoding in accordance with certain embodiments of the presently disclosed subject matter.
Figure 3:
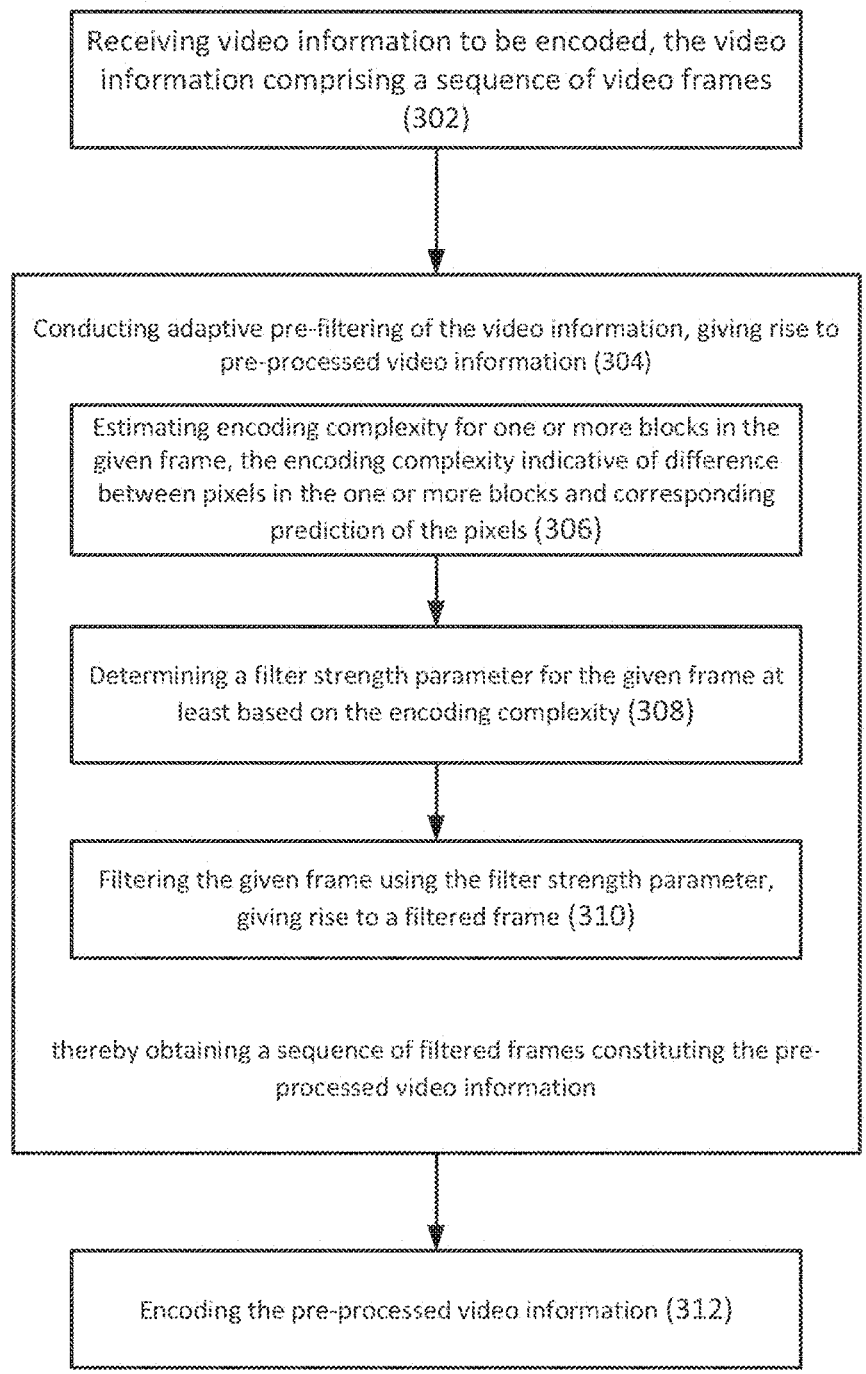
FIG. 3 illustrates a generalized flowchart of pre-processing video information for optimized video encoding in accordance with certain embodiments of the presently disclosed subject matter.
Figure 4:
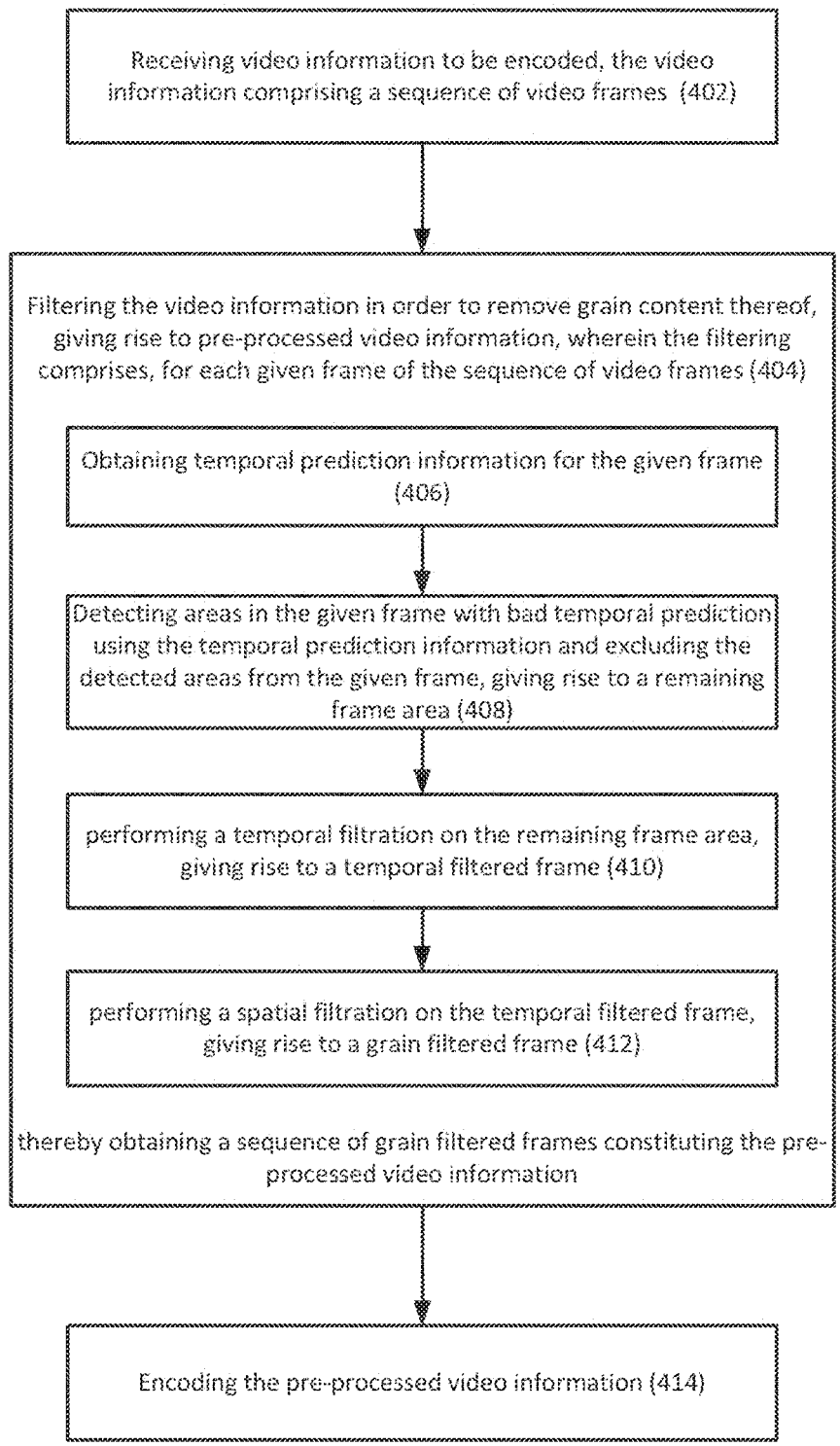
FIG. 4 illustrates a generalized flowchart of pre-processing video information for optimized video encoding in accordance with certain embodiments of the presently disclosed subject matter.

While not necessarily so, the process of operation of system 100 can correspond to some or all of the stages of the methods described with respect to FIGS. 2-4. Likewise, the methods described with respect to FIGS. 2-4 and their possible implementations can be implemented, either separately or in any suitable combination, by system 100. It is therefore noted that embodiments discussed in relation to the methods described with respect to FIGS. 2-4 can also be implemented, mutatis mutandis as various embodiments of the system 100, and vice versa.

Turning now to FIG. 2, there is illustrated a generalized flowchart of pre-processing video information for optimized video encoding in accordance with certain embodiments of the presently disclosed subject matter.

Video information to be encoded can be received (202) (e.g., by the I/O interface 120). As aforementioned, the video information comprises a sequence of video frames. For simplicity and brevity of the present disclosure, description of the video information and the sequence of video frames with reference to FIG. 1 is not repeated here.

The video information can be pre-processed (e.g., by the control circuitry 102). The pre-processing as will be described below with reference to block 204 addresses motion/movement alignment of the input video information, thereby improving encoding efficiency of motion estimation in the video encoding process. As is well known to those skilled in the art of video compression, motion estimation is one of the most costly operations required by a video encoder. Furthermore, high quality motion estimation, or good motion prediction allows for encoding a bitstream which, when decoded, will have the same quality as a higher bitrate bitstream with lower quality motion estimation, or will provide better quality decoded video at the same bit-rate of a bitstream with inferior motion estimation, i.e. by improving on motion estimation encoding, efficiency can be improved. A frame alignment method is proposed to improve encoding efficiency i.e. decrease bitrate without degradation of visual quality.

According to certain embodiments, the pre-processing can include the following: aligning (204) (e.g., by the control circuitry 102) a plurality of consecutive frames in the sequence of video frames by spatially shifting at least one frame of the plurality of consecutive frames, giving rise to a pre-processed sequence of video frames including the aligned plurality of consecutive frames. These teachings are quite flexible in practice and will accommodate various approaches in this regard.

In accordance with certain embodiments of the presently disclosed subject matter, the aligning described with reference to block 204 can comprise: detecting non-uniform camera movements of the plurality of consecutive frames, determining a camera movement value representative of the non-uniform camera movements and spatially shifting the at least one frame using the camera movement value. The term "camera" used herein should be expansively construed to cover any image and/or video capturing platforms or devices (such as, e.g., a camera lens) that was used to capture the video information.

In some cases, the non-uniform camera movements can be detected along a direction of camera movement, for example, to correct random camera movements along their original movement direction. For instance, in a somewhat simplified example, assuming a sequence of frames wherein calculation of motion vectors between each pair of consecutive frames yields the following motion vector values {10, 0}, {8,0}, {12,0}, {9,0}, {10,0}, each pair of numbers depicting the dr and dy components of the motion vectors of a corresponding frame. In this example the representative uniform motion is {10,0}, and benefit can be obtained by shifting the frames corresponding to the {8,0}, {12,0} and {9,0} MVs by dr of (+2), (−2) and (+1) pixels accordingly.

In some further cases, even fixed cameras can suffer from very small, random movement/motion noise over center positions. Compensation of such a type of movement noise before encoding can improve the motion vector prediction and thus improve overall resulting visual quality at the same bit-rate. To achieve this, the non-uniform camera movements can be detected with respect to a center position of at least a portion of each of the plurality of consecutive frames in order to correct the subtle motion noise introduced by camera. This can be done in lieu of the detection along a direction of camera movement or in combination therewith. For instance, in a somewhat simplified example assuming a sequence of frames wherein calculation of motion vectors between each pair of consecutive frames yields the following motion vector values {10,0.5}, {10,−1}, {10,1}, {10,−0.5}, {10,0.75}, each pair of numbers depicting the dx and dy components of the motion vectors of a corresponding frame. In this example the representative uniform motion is {10,0}, and benefit can be obtained by shifting the frames corresponding by the required dy offsets to align them with the uniform motion. By way of example, the center position can correspond to the center of an entire frame, or the center of a certain portion of the frame (e.g., center of an object in the scene). Such camera movements may be detected with respect to a given number of consecutive frames within the input sequence of video frames, such as, e.g., three consecutive frames.

In some embodiments, a camera movement value can be determined based on an average of the non-uniform camera movements. This representative camera movement value might constitute, for example, an estimated global movement value for the camera. In cases where there is a small difference or variance in camera movement, the original non-uniform movements can be substituted by the averaged movement, which can result in more smooth and uniform camera movements. In the example above, obtaining a sequence of frames which all have motion vectors of {2,0} allows more efficient temporal prediction resulting in faster motion estimation, less bits required for encoding motion vectors in coding schemes which support predicted MVs and finally can allow for bit savings in schemes that use interpolated frame prediction such as HEVC. In some cases, the granularity of the shifting of the at least one frame out of the plurality of consecutive frames can be determined. For instance, the shifting can be performed in a pixel or sub-pixel granularity.

In accordance with certain embodiments of the presently disclosed subject matter, another approach of aligning frames is now described. This approach can be practiced in lieu of the foregoing or in combination therewith as desired. In this example, (in the case of combining with the foregoing embodiments, at any stage prior to shifting the at least one frame), the plurality of consecutive frames can be aligned (e.g., by the control circuitry 102) along a sub-pixel grid that corresponds to an encoding scheme used in the encoding by the video encoder (e.g., HEVC/H.264/VP9). In certain embodiments, it is possible to perform motion compensation using a block within a frame at non-integer pixel locations, which is referred to as sub-pixel or sub-pel precision. The in-between pixels are generated by interpolating neighboring pixels. In some cases, half-pixel or quarter pixel precision (also referred to as Qpel, as used by H.264 and MPEG-4/ASP) can be used. The location of the interpolated pixels used in the sub-pixel precision is referred to as sub-pixel grid, so if the pixel grid is the locations in the frame two-dimensional space of the actual pixels, the sub-pixel grid is the locations in the two dimensional space of the image where the interpolated pixels lie, for example for half pel, the half-pel grid is shifted by half a pixel compared to the pixel grid.

This approach can be particularly useful when employed to correct subtle motion noise introduced by the camera which is at a smaller granularity than a pixel. Compensation of such a type of movement noise just before encoding can improve the motion vector prediction and thus improve overall, resulting in visual quality at a same bit-rate. This approach can also be used for the purpose of simplifying the motion estimation involved in the encoding process and therefore increasing computational efficiency of the encoding. This can be achieved, for example, by estimating high resolution sub-pixel motion in the at least one frame (e.g., by estimating sub-pixel movement of the camera in the at least one frame as relative to other frames in the plurality of consecutive frames, e.g., in two directions, both forward and backward, to find the original position), followed by compensating for the camera movement by shifting of the frame to the proper position, e.g., shifting the at least one frame in accordance with the estimated high resolution sub-pixel motion such that the at least one frame aligns with the sub-pixel grid.

There is now provided an illustrative example of the sub-pixel grid alignment. In some cases, certain video encoders have ¼- or ⅛-pixel accurate motion estimation. However, global motion vector can be calculated with a better accuracy using higher resolution interpolation filters than those supported in the standards.

Having calculated a global motion vector x with any desired resolution, a frame can be calibrated by shifting it by (mx−floor (mx))/m (i.e., a difference between x and x rounded to 1/m-pixel accuracy, depending on video codec, for example ¼- or ½ or even 1/1 e.g. full pel accuracy can be applied). This shift does not affect visual quality because the difference is extremely small. But it does significantly help the encoder to reduce motion compensated residual and therefore bitrate, as appropriate motion vectors can be found on the allowed MV grid, or at the appropriate MV resolution.

For instance, below there is shown a typical set of correlation values at different motion offsets. The value corresponding to full pel motion vector is at the center of the matrix, with value 315. Then correlation values for shifts of ¼ pixel are to the right and below, −¼ pixel to the left and above etc., so that the upper left value of 84 corresponds to a shift of {¾,−¾}. In this example the maximum correlation is found with value 453, i.e. a shift of 2/4 pixels in the horizontal axis and 0 in the vertical axis. Thus, by shifting the image by half a pixel, high quality motion estimation may be obtained with full-pel motion vectors.

| 84, | 75, | 91, | 172, | 270, | 217, | 286, |
| 94, | 167, | 77, | 210, | 215, | 310, | 220, |
| 103, | 103, | 111, | 188, | 222, | 195, | 263, |
| 93, | 156, | 114, | 315, | 276, | 453, | 319, |

-continued

| 87, | 88,  | 102, | 140, | 147, | 148, | 174, |
|-----|------|------|------|------|------|------|
| 84, | 155, | 92,  | 193, | 168, | 252, | 117, |
| 86, | 83,  | 94,  | 132, | 142, | 139, | 138, |

In another example, suppose the accurate motion vector with resolution of up to ⅛ pixel is calculated, and the optimal MV value is found to be {−⅛,⅝}, and suppose the codec in use supports only half-pel resolution. In such a case the image may be shifted by an ⅛ of a pixel horizontally and −⅛ of a pixel vertically resulting in a MV of {0,0.5} with accurate motion results providing higher encoding efficiency when encoding this content.

As has already been noted, these teachings are highly flexible in practice. Generally speaking, these teachings address three possible shifts that belong in turn to two types of shifts. The first type of shift pertains to stabilizing camera motion and the two shifts in this regard comprise shifts relative to actual motion of the camera (as detected along a direction of camera movement) or shifts that are relative to the frame center or a portion thereof (as detected with respect to a center position of at least a portion of each of the plurality of consecutive frames). The third shift which belongs to the second type of shift pertains to aligning with a sub-pixel grid, which can be implemented separately, or in combination with the first two shifts. With the foregoing in mind, these teachings will readily accommodate attending to only one of the three shifts. Furthermore, these teachings can also accommodate attending to any suitable combination of these three shifts. For example, these teachings can accommodate attending to only the shifts relative to actual motion of the camera in combination with the shifts pertaining to aligning with a sub-pixel grid, or, alternatively, the shifts that are relative to the frame center or a portion thereof in combination with the shifts pertaining to aligning with a sub-pixel grid.

The pre-processed sequence of video frames can be encoded (206) (e.g., by the control circuitry), using block-based motion estimation, wherein the block-based motion estimation is optimized by using the pre-processed video information.

Pre-processing the video information in this way as described above with reference to FIG. 2 can greatly facilitate and simplify motion estimation (e.g., block-based motion estimation) as carried out by the video encoding module 106. Since motion estimation is typically highly relevant to resultant compression quality and also constitutes one of the more computational intensive aspects of modern video compression, pre-processing the video information in this way can simplify computational requirements/time for the video encoder and thereby achieve a variety of technical improvements and benefits.

Note that the described pre-processing for motion alignment can offer at least two benefits with respect to the motion estimation applied as part of the encoding process after the pre-processing. First, motion estimation will be more accurate thus creating smaller residuals for the encoder, in turn resulting in lower bitrates. Second, improved motion estimation also minimizes motion artifacts that are created in the encoding process that can no longer be treated at the pre-processing stage, thus offering better looking video content. A third benefit is that in schemes which use predictive motion vectors, less bits are required for coding the motion vectors after motion alignment— which, for low bit-rates, can be significant. In addition, motion alignment prior to performing motion estimation can make motion estimation algorithms converge faster, thus decreasing run-time of the encoder. The block-based motion estimation is therefore optimized by using the pre-processed video information instead of the unprocessed video information.

In addition it is possible to use overlapped block motion estimation techniques to obtain more detailed motion alignment. Overlapped block motion compensation (OBMC) can help to avoid blocking artifacts. When using OBMC, blocks are typically twice as big in each dimension and overlap quadrant-wise with all neighboring blocks. Thus, each pixel belongs to multiple (such as, e.g., 4) blocks. In such a scheme, there are multiple (such as, e.g., 4) predictions for each pixel that are summed to a weighted mean. For example, one can perform separate alignment per each macroblock or coding unit, thus aligning different parts of the frame by different amounts. By using overlapped motion estimation, this alignment can be performed without quality degradation or blocking artifacts.

Experimenting with proposed algorithms for motion alignment showed benefits in compression gain, e.g. improved encoding efficiency. In addition, when performing an experiment where sub-pel motion has random added noise, encoding using the same quality and compression parameters creates a bitstream that is over 30% larger, thus demonstrating the potential benefit of performing motion alignment in extreme cases of significant motion misalignment.

In the above description, motion alignment has been addressed, which is found to be the most common scenario in video clips in this context. Similar algorithms, however, may be employed to perform zoom and rotation alignment in relevant videos, and thus obtain compression gains also in these scenarios.

Referring now to FIG. 3, there is presented a generalized flowchart of pre-processing video information for optimized video encoding in accordance with certain embodiments of the presently disclosed subject matter.

Video information to be encoded can be received (302) (e.g., by the I/O interface 120). As aforementioned, the video information comprises a sequence of video frames. For simplicity and brevity of the present disclosure, description of the video information and the sequence of video frames with reference to FIG. 1 is not repeated here.

The video information can be pre-processed (e.g., by the control circuitry 102). The pre-processing as will be described below with reference to block 304 addresses adaptive pre-filtering of the input video information, thereby improving and optimizing the subsequent video encoding process (e.g., enabling the encoded video sequence to have the same quality at a higher bitrate, or have better quality at the same bit-rate).

Video pre-filtering was previously treated either in a plain (i.e., non-adaptive) way or by performing some quality analysis on-the-fly. There are significant drawbacks in both approaches. Non-adaptive pre-filtering may cause blurring, while quality analysis on-the-fly often greatly reduces performance. Video pre-filtering is especially useful for low bitrate encoding because the lower the bitrate is, the more coding artifacts become noticeable. Finding an optimal trade-off between advantages and drawbacks of video pre-filtering and determining optimal filter parameters is a challenging task especially when low bitrate encoding is required.

According to certain embodiments of the presently disclosed subject matter, adaptive pre-filtering of the video information can be conducted (304) (e.g., by a control circuitry), giving rise to pre-processed video information. The conducting can comprise, for each given frame of the sequence of video frames: estimating (306) encoding complexity for one or more blocks in the given frame, the encoding complexity indicative of difference between pixels in the one or more blocks and corresponding prediction of the pixels, determining (308) a filter strength parameter for the given frame at least based on the encoding complexity, and filtering (310) the given frame using the filter strength parameter, giving rise to a filtered frame, thereby obtaining a sequence of filtered frames constituting the pre-processed video information.

At block 306, the encoding complexity is estimated for one or more blocks in the given frame. Encoding complexity (also referred to as video complexity) can be estimated, for example, on a frame by frame basis. By one approach, for each frame a parameter frame_cost (also termed as frame cost) can be assigned. For example, frame_cost can be indicative of frame complexity and can be calculated as follows: First, each frame can be divided into blocks of 16×16 pixels, as shown in below matrix.

| $a_{1,1}$ | ... | ... | ... | $a_{1,i}$ | ... | $a_{1,16}$ |
|---|---|---|---|---|---|---|
| ... | | | | | | |
| $a_{j,1}$ | | | | $a_{i,j}$ | | |
| ... | | | | | | |
| $a_{16,1}$ | | | | | | |

For each given frame, the corresponding block parameters intra_block_cost and inter_block_cost representative of block complexity, are calculated. These parameters are indicative of the difference between pixels in a block of the given frame, and corresponding prediction of the pixels. By way of example, the parameter intra_block_cost can be calculated using pixel-by-pixel intra prediction from the edge pixels in the block using a function such as, e.g., Sum of Absolute Differences or SAD cost function, e.g., $$\text{intra\_block\_cost} = \sum_{i,j} \left| a_{i,j} - \frac{j * a_{1,i} + i * a_{j,1}}{ij} \right|.$$

The parameter inter_block_cost can be calculated using any motion vector prediction for the block: inter_block_cost= $\Sigma_{i,j}|a_{i,j}-a_{i,j\ pred}|$, where $a_{i,\ j\ pred}$ is the motion vector predicted pixel for $a_{i,\ j}$.

The parameter frame_cost can be estimated based on the block parameters. For instance, if a scene change occurs in the current frame, frame_cost=Σblocks in frame log² (intra_block_cost), since the motion compensated prediction is not relevant at scene change. For other frames, frame_cost=$\Sigma_{blocks\ in\ frame}$ log²(min(intra_block_cost, inter_block_cost)). The frame_cost can be used as the encoding complexity for a given frame, or alternatively, the encoding complexity can be derived from the frame_cost.

Once the encoding complexity is estimated, a filter strength parameter can be determined (308) for the given frame at least based on the encoding complexity. By way of example, one can use a sequence of frame costs combined with expected video bitrate to estimate an appropriate filtering strength parameter. To determine the relation between desired filter strength and these values, one can apply different approaches. According to certain embodiments, the filtering strength estimation can be based on either heuristics, i.e. results of experimentation and deduction, or machine learning models.

Figure 5:
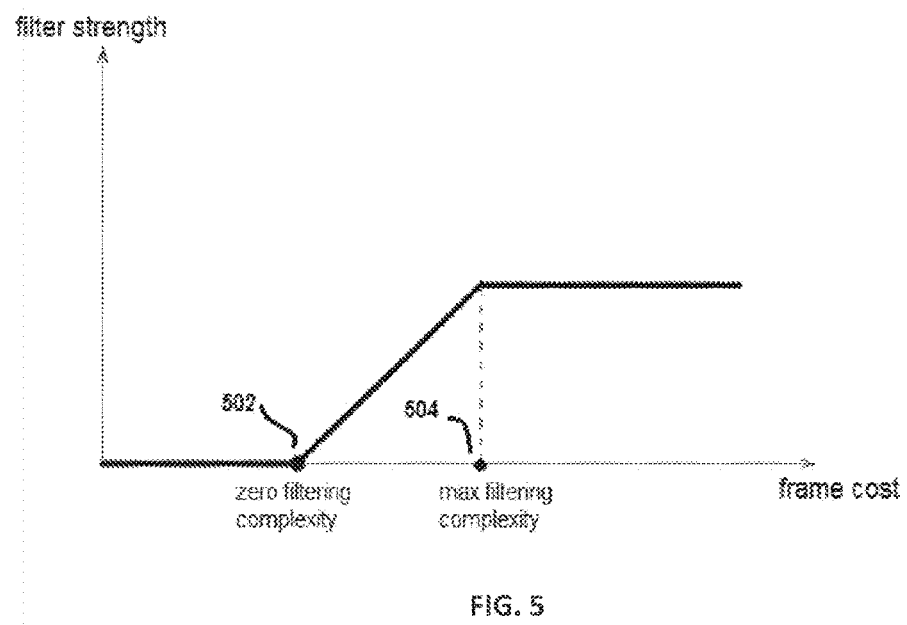
FIG. 5 illustrates an exemplary linear model for determining the filter strength parameter based on encoding complexity as well as other parameters in accordance with certain embodiments of the presently disclosed subject matter.

By one approach, for example, the filter strength parameter can be determined using a linear model based on one or more video characteristics of the video information selected from a group comprising: the encoding complexity, bitrate, frame rate, and frame resolution (e.g., resolution in pixels). FIG. 5 illustrates an exemplary linear model for determining the filter strength parameter based on encoding complexity (e.g., frame cost) as well as other parameters in accordance with certain embodiments of the presently disclosed subject matter. For instance, obtaining such video characteristics as the desired bitrate b and the number of frames per second (i.e., frame rate), one can determine parameter bits_per_pixel=1000*b/(n*frame_width*frame_height).

Then one can calculate the values zero_filtering_complexity 502 and max_filtering_complexity 504 depending on bits_per_pixel (using, for example, a lookup table).

As illustrated in FIG. 5, zero_filtering_complexity 502 is such a value that if frame_cost<zero_filtering_complexity, the filtering may not be applied (i.e., the filter strength parameter is zero), and max_filtering_complexity 504 is such a value that if frame_cost>max_filtering_complexity, the filtering strength is saturated and will remain constant and no longer increase. Filter strength in-between can then be determined linearly depending on frame_cost between two frame cost borders.

As another example, the filter strength parameter can be determined using a machine learning model based on one or more video characteristics of the video information selected from a group comprising: the encoding complexity (e.g., block cost and/or frame cost), bitrate, frame rate, and frame resolution. The machine learning model can be employed by, for example, by combining block parameters intra_block_cost and/or inter_block_cost, frame_cost, bitrate, and frame resolution with logistic regression to obtain a set of features that facilitate determining the filtering strength.

The given frame can be filtered (310) using the filter strength parameter, giving rise to a filtered frame. Filtering a frame with a filter strength parameter can be realized by using any Low Pass, smoothing or blurring filter such as a Gaussian smoothing filter. The filter strength is used for example as a multiplier to the basic filter convolution kernel. The sequence of filtered frames therefore constitute the pre-processed video information, which is then encoded (312) (e.g., by the video encoding module 106).

Figure 6:
FIG. 6 illustrates an example of a saliency map in accordance with certain embodiments of the presently disclosed subject matter.
Figure 6:

It will be seen further below that this adaptive pre-filtering approach can be further adapted according to saliency information for the frame. Accordingly, if desired, this process as described above with reference to block 304 can include an optional step to generate a saliency map for at least a portion of each given frame. The saliency map is indicative of one or more areas in the at least a portion each associated with a degree of visual importance. FIG. 6 illustrates an example of a saliency map in accordance with certain embodiments of the presently disclosed subject matter. The top frame is the original frame and the bottom frame is the one with corresponding saliency map. As shown in the below frame, the areas in the frame that include highlighted portions (shown as bright colors) correspond to areas with high saliency. Generation of a saliency map can comprise extracting one or more features characterizing the given frame and using the one or more features to generate the saliency map, as will be described below in various embodiments.

There exist different approaches for saliency map calculation, with varying computational complexity and accuracy. The general idea of all methods is to try and accurately predict the areas in the frame that have high visual importance i.e., areas that have high visual importance to the viewer and that are accordingly important to render with high quality, and areas that have lower visual importance and where quality can be reduced without adverse perceptual affect. Some of the approaches use a method based on transforming the original image into a feature space (i.e., a DCT or wavelet domain, or a different color space such as DKL, HSV etc.) and calculating a saliency map based on these features. It is possible to use more or fewer features in the saliency map calculation and thus control the speed/quality tradeoff. For example, one may use a scheme where different levels of feature spaces can be applied. For instance, each level can introduce an additional feature space with respect to the previous one, so that the level increment leads to increasing both saliency map accuracy and computational complexity. For example, one may choose to use the following levels:

Level 1: using only image luminance for saliency calculation

Level 2: introduces DKL color space conversion to level 1

Level 3: introduces orientation features to level 2

Level 4: introduces motion flow to level 3—i.e., using information from adjacent frames to determine areas of motion that draw visual attention.

In some embodiments, the one or more features that are extracted from the given frame can be selected from a group comprising: intricateness, gradient, smoothness, grain, face, skin, chroma, level of photo-realism, luminance, and motion of the given frame, which can be used to generate the saliency map. In one example, if the input video information is a previously compressed clip, information from the encoded bitstream can be used to derive or improve the saliency map, for example by using algorithms in line with those proposed to estimate the intricateness of different areas in each frame as set forth in the PCT application entitled "Method and system of controlling a video content system" published on Aug. 4, 2016 under publication number WO 2016/120871, which is incorporated herein in its entirety by reference. Examples of calculation of a smoothness value indicative of an extent of smoothness of an encoded frame, a gradient value indicative of an extent of gradual spatial changes of an encoded frame, and the level of chroma artifacts introduced in an encoded frame are described in PCT application entitled "Method and system of controlling a quality measure" published on Sep. 15, 2016 under publication number WO 2016/142931, which is incorporated herein in its entirety by reference. Examples of calculation of a synthetic value indicative of an extent of photo-realism of a frame is described in PCT patent application WO2013/144942 published on Oct. 3, 2013, which is incorporated herein in its entirety by reference. Examples of calculation of a grain value indicative of an extent of grain in a frame are described in PCT Application entitled "Method of controlling a quality measure and system thereof" published on May 26, 2017 under publication number WO 2017/085708, which is incorporated herein in its entirety by reference.

In yet another example the saliency map may be derived by first applying various detectors or classifiers to the frame to locate visually important data, such as skin detection, face detection, detection of areas with significant edge information, and so forth. The corresponding results can then be used to obtain a saliency map, indicating areas in the frame with higher visual importance.

Once the saliency map is generated, the filtering of block 310 can be performed by adaptively filtering the given frame according to the saliency map using the filter strength parameter. By way of example, the aforementioned filter strength parameter can be adapted for each area or portion of the frame according to the saliency map, such that different areas or portions of the frame can be filtered according to different adapted filter strength parameters. In some cases, this approach can serve to filter only areas that were not determined to have high saliency. The regions of a frame that are related to high values in the saliency map are important for visual quality and in some cases are not altered.

By one approach, this filtering technique can be implemented using this formula: $I_{output}=(1-S)*I_{filtered}+S*I_{original}$, where S is the per pixel saliency map value (which indicates the degree of visual importance thereof) normalized to [0; 1] interval, with 1 indicating high saliency; and $I_{original}$, $I_{filtered}$, and $I_{output}$ correspond to original frame, its filtered version (without taking into consideration the saliency map) and output frame respectively.

Referring now to FIG. 4, there is presented a generalized flowchart of pre-processing video information for optimized video encoding in accordance with certain embodiments of the presently disclosed subject matter.

Video information to be encoded can be received (402) (e.g., by the I/O interface 120). As aforementioned, the video information comprises a sequence of video frames. For simplicity and brevity of the present disclosure, description of the video information and the sequence of video frames with reference to FIG. 1 is not repeated here.

The video information can be pre-processed (e.g., by the control circuitry 102). The pre-processing as will be described below with reference to block 404 addresses filtering the video information in order to remove grain content thereof, thereby improving and optimizing the subsequent video encoding process (e.g., enabling the encoded video sequence to have the same quality at a higher bitrate, or have better quality at the same bit-rate).

Film grain is a well-known challenge for video encoders. Due to its random nature, it can be very difficult to compress grainy film content using transform based coding. At the same time, preserving film grain is often mandatory since it provides a "cinema" look and feel.

Temporal filtering of grain as previously conducted is based on a motion compensation procedure. The idea of this procedure is as follows: for each target block from current frame, a matching block from another frame is found. Since film grain is independent between different frames, averaging between current or target and corresponding motion-compensated blocks, results in a filtration.

This approach provides quite good results for areas with well-defined textures or objects, where motion estimation is accurate and the grain is the true difference signal between two matched blocks. However, for smooth regions where the information or local variability consists mainly of grain data, this approach provides rather poor results, due to the fact that for each target film grain block, the motion estimation yields a corresponding block primarily based on the grain pattern, thus essentially matching the most similar film grain block from another frame. Thus the grain is perceived as actual information and is not filtered out.

On the other hand, there are approaches based on spatial filtering of grain which have quite good results for smooth areas, where the variance or texture is primarily grain related, but unfortunately may smear true textures of object edges.

Thus it is now proposed to apply a combination of spatial approach and temporal approach, e.g., applying a spatial based approach after applying a temporal based approach, as described in detail below. Results obtained with this combined approach show that by combining spatial and temporal filters together, all edges are preserved, while remaining film grain is removed.

Figure 7:
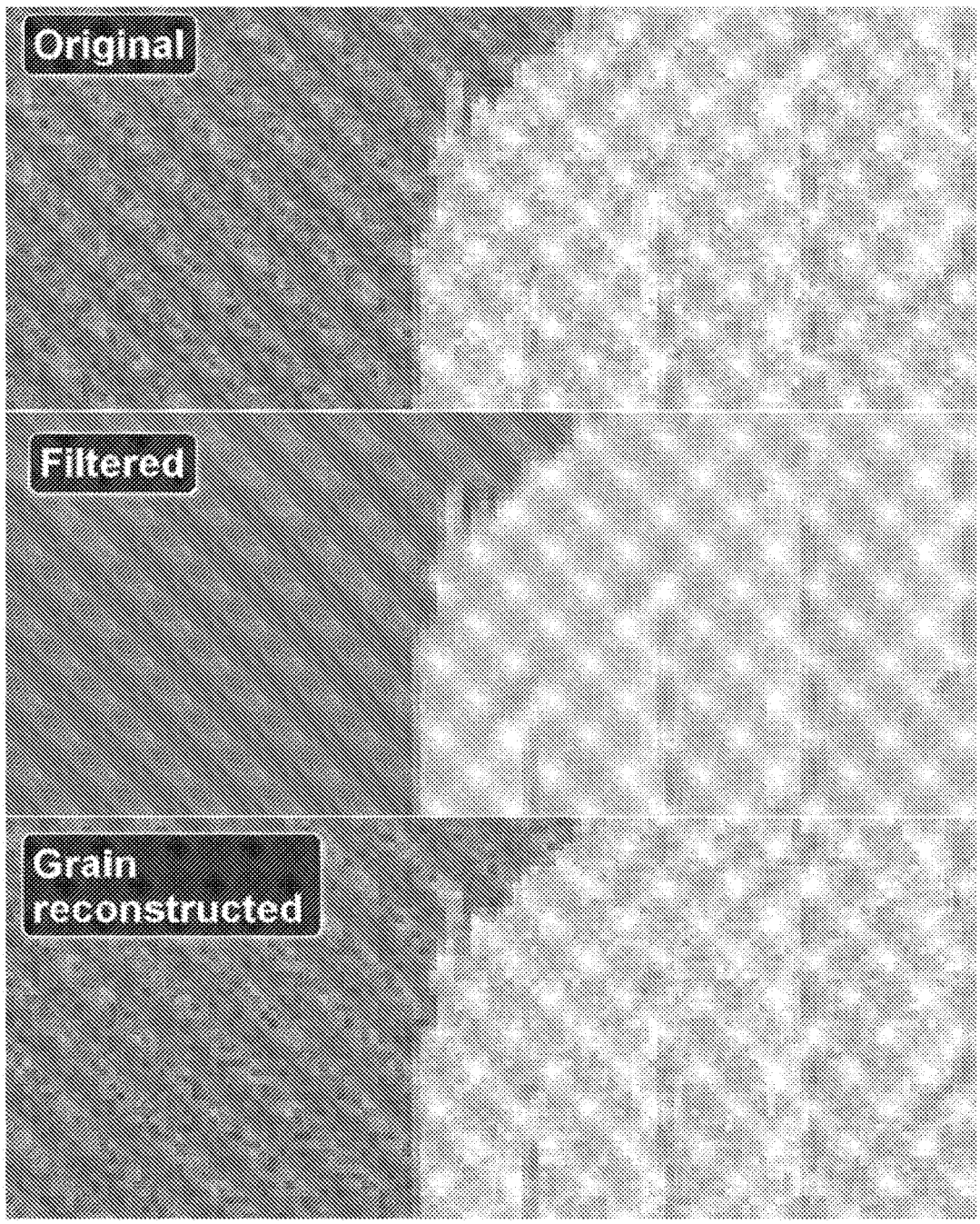
FIG. 7 illustrates an example of film grain filtration and reconstruction in accordance with certain embodiments of the presently disclosed subject matter.

Pursuant to one approach of the presently disclosed subject matter and in general, detected film grain can be removed using an adaptively-tuned spatial-temporal filter (or separate spatial filter and temporal filter). This filter can be adjusted for every 16×16 block. The corresponding filter parameters can be selected as a function of average block luminance. As a result, film grain is accurately removed while preserving edges in the video content. Film grain parameters can then be saved and provided in supplemental enhancement information (SEI) messages. Pre-processed video information with removed film grain is then passed to the video encoder 106 and can be encoded using a much lower bitrate while still providing a same level of perceptible quality as compared to prior approaches in this regard. SEI messages have standardized syntax for HEVC and AVC video codecs and can be transmitted to the decoder side and used by the decoder to restore the film grain when decoding the encoded video information with film grain removed. FIG. 7 illustrates an example of film grain filtration and reconstruction in accordance with certain embodiments of the presently disclosed subject matter. The top frame is the original video frame, the middle frame is the filtered frame with film grain removed resulting from certain embodiments described with reference to FIG. 4, and the bottom frame is the reconstructed frame at the decoder side within which the film grain is restored, as described above.

In addition, in some cases there are some areas of motion compensated frame which do not match corresponding areas from the original frame. Scenarios in which such areas can appear to include, but are not limited to the following cases:
  Object transformations;
  Objects overlapping;
  Change of scene brightness, color or other global characteristics.

Using such areas in the temporal filtration process results in various artifacts, i.e., apart from removing noise, filtered frame contains additional information, irrelevant to the original frame. Therefore, the proposed combined approach, as mentioned above, also addresses this issue by means of detecting areas with bad prediction, in order to improve temporal filtration. It considers two different aspects:
  1) Presence of constant component in motion compensated area compared to the original frame (which indicates fading/change of brightness etc.)
  2) Significant deviation of difference between original and motion compensated frame (which indicates objects transformation or overlapping)

Referring back to FIG. 4, at block 404 where the video information is filtered in order to remove grain content thereof, the filtering can comprise, for each given frame of the sequence of video frames: obtaining (406) temporal prediction information for the given frame, detecting (408) areas in the given frame with bad temporal prediction using the temporal prediction information and excluding the detected areas from the given frame, giving rise to a remaining frame area, performing (410) a temporal filtration on the remaining frame area, giving rise to a temporal filtered frame, performing (412) a spatial filtration on the temporal filtered frame, giving rise to a grain filtered frame, thereby obtaining a sequence of grain filtered frames constituting the pre-processed video information.

Temporal prediction for a given frame can be performed by the control circuitry 102 to yield a motion compensated frame (i.e., temporal prediction information) of the given frame. For instance, a motion compensated frame can be created using a reference frame, e.g., a previous frame of the given frame. Alternatively, the information on temporal prediction can be received along with the given frame. According to certain embodiments, detection of areas with bad temporal prediction can comprise: calculating absolute summation between the given frame and a motion-compensated frame thereof on a per block basis, comparing the absolute summation with at least one detection threshold; and identifying, based on the comparison, one or more poorly predicted blocks to be the areas with bad temporal prediction, as will be described below.

According to certain embodiments, the calculating of an absolute summation can comprise:
  1) calculating difference values between pixels of the given frame and a motion-compensated frame thereof, giving rise to a residual frame, for instance, as illustrated by the below formula:

$$R(x,y)=F(x,y)-MC(x,y) \quad \forall x \in [0,w), y \in [0,h)$$

where R(x, y), F(x, y), MC(x, y) are pixels of residual, original and motion compensated frames respectively, located at position (x, y); and w, h is the width and height of a frame.
  2) splitting the residual frame into a plurality of blocks, e.g., blocks of size N (e.g., N=16); and
  3) calculating an absolute summation for each given block in the residual frame. By way of example, the absolute summation can be a sum of absolute difference values within the given block. By way of another example, the absolute summation can be absolute of sum of difference values within the given block.

Continuing with above example, there is illustrated a comparison of the absolute summation with at least one detection threshold and the identifying one or more poorly predicted blocks to be the areas with bad temporal prediction.

Block with coordinates (x, y) is considered to be poorly predicted if any of following conditions is satisfied:
  1) Absolute summation as average of absolute difference values of residual block exceeds a first detection threshold (i.e., residual block has many poorly predicted pixels):

$$\frac{1}{N^2} \sum_{i=1}^{N} \sum_{j=1}^{N} |R(x+j, y+i)| > T_1$$

2) Absolute summation as absolute value of residual block average (sum of difference values being averaged) exceeds a second detection threshold (i. e. residual block has a constant component):

$$\frac{1}{N^2} \left| \sum_{i=1}^{N} \sum_{j=1}^{N} R(x+j, y+i) \right| > T_2$$

The two detection thresholds $T_1$ and $T_2$ are selected or set adaptively based on one or more grain strength values associated with the given frame, as will be described below. In other words, the detection of areas with bad temporal prediction can be configured using the one or more grain strength values and the configuration is done by setting the detection threshold(s).

Through the above process, a map of poorly predicted blocks can be generated. Based on the obtained map, poorly predicted blocks can be excluded from temporal filtration (e.g., by excluding the detected areas from the given frame, giving rise to a remaining frame area, and performing the temporal filtration on the remaining frame area).

At block 410, temporal filtration is performed on the remaining frame area. According to certain embodiments, such temporal filtration can be performed by: calculating a filtered pixel value for each given pixel in the remaining frame area based on a weighted summation of pixel values of the given pixel in the remaining frame area and at least one corresponding pixel in at least one motion estimated frame of the given frame, giving rise to the temporal filtered frame. In some cases, performing a temporal filtration can be configured based on one or more grain strength values associated with the given frame. For example, the weights as applied in the weighted summation can be configured by the one or more grain strength values. In some cases, performing a spatial filtration can be configured by setting one or more following parameters used in the spatial filtration: filter size, filter strength, and edge related parameters.

The grain strength values are indicative levels of grain strength or intensity in a frame. In some embodiments, the grain strength values associated with frames can be received as input. In some other embodiments, the one or more grain strength values can be calculated, as a step included in the filtering of block 404. The calculation of the grain strength values can comprise: splitting the given frame into one or more luminance intervals based on pixel values thereof; and calculating a grain strength value for each given luminance interval based on variance of blocks within the given interval, giving rise to one or more grain strength values corresponding to the one or more luminance intervals. An example of this aspect is given below.

Film grain intensity can be estimated using grain variance. For variance estimation, the current frame and corresponding residual frame(s) are analyzed according to the steps described below. Note that as the residual frame combines the grain from both the current and the reference frames, grain strength in this residual frame is actually double that of grain strength in the current frame. Since film grain depends on the intensity of background pixel, film grain variance should be estimated independently for different intervals of pixel intensity values. The procedure is as follows:

1. Split range of pixels values into N intervals: $(T_1, T_2, \ldots, T_N)$. N is an algorithm parameter. The interval boundaries are selected so that for current frame each interval would be represented with almost an equal number of blocks. For example, if N=4 then for a dark frame the intervals may be: {[0; 24], [25; 37], [38; 90], [91, 255]} whereas the intervals for a bright frame may be the following: {[0; 155], [156; 191], [192; 218], [219; 255]}.
2. For each interval i, collect sample $S_i$ of variances calculated for each block with average value that falls in range $T_i$:

$S_i = \{\sigma_j^2 | j \in [1; M] \hat{} \mu_j \in T_i\}$ where $\sigma_j^2$ and $\mu_j$ are estimation of j-th block variance and mean, and M is the total number of blocks in image.
3. Next step is to estimate $\sigma_i^2$—the variance for each interval, using collected samples $S_i$. Ideally this may be done by taking the smallest value $\sigma_{(1)}^2$ from $S_i$ assuming that such a value corresponds to the flat area of a frame with only film grain on it. However, in practice, a single value is not statistically significant, therefore the better approach is to average 5% of smallest values from the samples. Another problem is that a frame may contain areas with marginal characteristics, for example overexposed areas or artificial data (such as labels, black frame, etc.) which lack film grain. Therefore, the following procedure is proposed:

a. Calculate ($q_z$), the percentage of blocks with zero variance
   b. If $q_z \leq 0.5$ then assume $\sigma_i^2 = 0$, i. e. interval i has no film grain
   c. If $q_z < 0.5$ then:
      i. Remove zero variances from sample
         $S_i: S_i' = \{\sigma_j^2 | \sigma_j^2 \in S_i \hat{} \sigma_j^2 \neq 0\}$
      ii. Take 5% of smallest variances from sample (but no less than 10): $\tilde{S}_i = \{S_{i(1)}', S_{i(2)}', \ldots, S_{i(K)}'\}$, where K=min(10, 0.05·|$S_i'$|)
      iii. Set $\sigma_i^2$ to mean value of sample $\tilde{S}_i$ multiplied by coefficient c: $\sigma_i^2 = \text{mean}(\tilde{S}_i) \cdot c$
      where $$c = \begin{cases} 1, & q_z \leq 0.1 \\ 1 - \frac{9}{4}(q_z - 0.1), & 0.1 < q_z < 0.5 \end{cases}$$

The meaning of coefficient c is as follows. Blocks with zero variance, discarded at step "i", can either be an artificial data (such as labels) while the rest of the frame is grainy, or they can be actual frame areas without grain. The more blocks with zero variance that are found in a frame, the more the likelihood that the frame does not contain grain. Taking into account the fact that in case of $q_z > 0.5$ the frame is considered to be without grain, the remaining range of possible values of $q_z$ are split into two intervals: [0; 0.1) and [0.1; 0.5). The first interval corresponds to the case where zero-variance blocks are just some labels and can be simply excluded from consideration—the final variance can be estimated simply by averaging: $\sigma_i^2 = \text{mean}(\tilde{S}_i)$. In case of the second interval, the possibility of actual absence of grain is higher: the higher $q_z$ the higher the possibility. Therefore interval [0.1; 0.5) for $q_z$ is mapped into interval [1; 0.1) for c, i.e. if percentage of zero variances is rather small (such as $q_z = 0.11$) then the final variance is almost not scaled: $\sigma_i^2 = \text{mean}(\tilde{S}_i) \cdot 0.99$, but when the percentage is high, for example $q_z = 0.499$, then the result will be scaled by almost 0.1: $\sigma_i^2 = \text{mean}(\tilde{S}_i) \cdot 0.102$ Due to the nature of film grain, it is possible that different frames of the same video can have added film grain with varying strength. Furthermore, the grain strength can differ within a single frame according to the pixel intensity values. Therefore, filtering all frames with a uniform strength filter may fail to remove film grain from some areas.

It is therefore proposed to perform adaptive selection of filtration parameters, using the following steps. First a number of intervals are defined, each interval corresponding to a range of pixel intensity or luminance values. The intervals are selected so that each of the intervals corresponds to a similar number of pixels in the frame. Next, the film grain variance $\sigma^2$ is estimated for each interval, as is explained in further detail in the following paragraph. Then, a corresponding set of parameters P is calculated basing on a look up table which is obtained empirically, by analyzing multiple video sequences with different film grain characteristics:

| Variance | Parameters set |
|---|---|
| $\sigma_1^2$ | $P_1$ |
| $\sigma_2^2$ | $P_2$ |
| ... | ... |
| $\sigma_N^2$ | $P_N$ |

For example, if estimated variance for some interval equals $\sigma_x^2$ then the corresponding parameters set $P_x$ is calculated as follows: first, two variance values with indices i and i+1 are found in table, so that $\sigma_i^2 < \sigma_x^2 < \sigma_{i+1}^2$; next, the resulting parameters set is found by interpolation: $P_x$=interpolate($P_i$, $P_{i+1}$).

The film grain dependent parameters set should reflect the following aspects:
  The more grainy the image is, the stronger the spatial filter applied should be;
  Edge detection should be less sensitive when applied to a frame with a strong film grain, in order to avoid false detections;
  Film grain with high intensity leads to high energy of residual frames, therefore the thresholds for bad prediction detection should be less strict.

The proposed method includes the following adaptive parameters:
  Spatial filtration parameters (e.g., used to configure Spatial filtration, as described above):
    $R_G$—Gaussian kernel radius
    $\sigma_G$—Gaussian kernel standard deviation
  Edge detection parameters (e.g., used to configure Spatial filtration, as described above):
    Pixels energy threshold ($T_e$). Pixel energy is defined as $E=\sqrt{E_x+E_y}$, where $E_x$ and $E_y$ are obtained by applying 1D edge detection filter to a frame along vertical and horizontal axes respectively. A non-limiting example of the 1D filter coefficients is given by:
    $\frac{1}{16}[-1, 2, 6, 2, -1, 0, 1, -2, -6, -2, 1]$
    Search radius ($R_e$) and edge pixels ratio ($k_e$) for edge map refinement. Edge map refinement is a procedure of excluding isolated pixels from an intermediate edge map, i.e. a candidate edge pixel is excluded from the map if within a radius $R_e$ the percentage of edge pixels does not exceed ratio $k_e$.
  Parameters of bad prediction detection (e.g., used to configure detection of areas with bad temporal prediction, as described above):
    Threshold $T_1$ for average of absolute values of residual block
    Threshold $T_2$ for absolute values of residual block average Following is a numeric example for the proposed algorithm.

Suppose the i-th frame of grainy video sequence is processed. The frame is split into blocks comprising 16×16 pixels. For each block, the film grain variance is estimated, as detailed below. In this example it is assumed that the variance of l-th block is $\sigma_l^2$=10.9. Then the parameters set $P_l$ for this block can be estimated by finding the closest variance values from reference table, which are: $\sigma_i$=4.7 and $\sigma_{i+1}$=14.0.

| $\sigma$ | $R_G$ | $\sigma_G$ | $T_e$ | $R_e$ | $k_e$ | $T_1$ | $T_2$ |
|---|---|---|---|---|---|---|---|
| ... | | | | | | | |
| 4.7 | 2 | 1.5 | 1.2 | 2 | 12/25 | 8.3 | 2.3 |
| 14.0 | 2 | 2.5 | 1.6 | 2 | 12/25 | 11.0 | 3.3 |
| ... | | | | | | | |

$P_l$ can then be calculated by linear interpolation between parameters sets $P_i$ and $P_{i+1}$ with coefficient $$\frac{\sigma_l - \sigma_i}{\sigma_{i+1} - \sigma_i} = \frac{10.9 - 4.7}{14 - 4.7} = \frac{2}{3}.$$

Therefore, $P_l = \frac{1}{3}P_i + \frac{2}{3}P_{i+1}$. The resulting parameters set obtained is therefore: $P_l$=(2; 2.17; 1.47; 2; 12/25; 10.1; 2.97).

This approach also works for areas or frames with no film grain—in such cases the estimated parameters set will lead to almost no filtering.

When using the temporal filtration method, multiple previous frames may be used, i.e. frames $\{f_{i-1}, f_{i-2}, \ldots, f_{i-N}\}$ are used to filter frame $f_i$. A problem may arise in that after a scene change, previous frames will not be useful for temporal filtration, since they depict a different scene. It is therefore proposed to add a scene change detector to the system, and when scene change is detected, to use future rather than previous frames as the temporal filtration input.

Referring again to FIG. 4, at block 414, the pre-processed video information can be encoded (e.g., by the video encoder 106).

Thus configured, these teachings provide for pre-processing video information in a way that specifically makes that information easier for a video encoder to compress, such that a desired level of quality can be attained in a reduced amount of time, with reduced computational requirements, and/or using a reduced bit rate as compared to non-pre-processed content.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

It is to be noted that the examples and embodiments described herein are illustrated as non-limiting examples and should not be construed to limit the presently disclosed subject matter in any way.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method of pre-processing video information for optimized video encoding, the method comprising:

receiving, by an I/O interface, video information to be encoded, the video information comprising a sequence of video frames;

conducting, by a control circuitry, adaptive pre-filtering of the video information, giving rise to pre-processed video information, wherein the conducting comprises, for each given frame of the sequence of video frames:

estimating encoding complexity for one or more blocks in the given frame, the encoding complexity indicative of difference between pixels in the one or more blocks and corresponding prediction of the pixels;

determining a filter strength parameter for the given frame at least based on the encoding complexity;

generating a saliency map for at least a portion of the given frame, the saliency map indicative of one or more areas in the at least a portion each associated with a degree of visual importance; and adaptively filtering the given frame according to the saliency map using the filter strength parameter, giving rise to a filtered frame;

thereby obtaining a sequence of filtered frames constituting the pre-processed video information; and encoding, by the control circuitry, the pre-processed video information.

2. The computerized method according to claim 1, wherein the determining comprises determining the filter strength parameter using a linear model based on one or more video characteristics of the video information selected from a group comprising: the encoding complexity, bitrate, frame rate, and frame resolution.

3. The computerized method according to claim 1, wherein the determining comprises determining the filter strength parameter using a machine learning model based on one or more video characteristics of the video information selected from a group comprising: the encoding complexity, bitrate, frame rate, and frame resolution.

4. The computerized method according to claim 1, wherein the generating comprises extracting one or more features characterizing the given frame, the one or more features selected from a group comprising: intricateness, gradient, smoothness, grain, face, skin, chroma, level of photo-realism, luminance, and motion of the given frame, and generating the saliency map using the one or more features.

5. A computerized method of pre-processing video information for optimized video encoding, the method comprising:

receiving, by an I/O interface, video information to be encoded, the video information comprising a sequence of video frames;

filtering, by a control circuitry, the video information in order to remove grain content thereof, giving rise to pre-processed video information, wherein the filtering comprises, for each given frame of the sequence of video frames:

obtaining temporal prediction information for the given frame;

detecting areas in the given frame with bad temporal prediction using the temporal prediction information and excluding the detected areas from the given frame, giving rise to a remaining frame area, wherein the detecting areas in the given frame with bad temporal prediction is configured using one or more grain strength values associated with the given frame;

performing a temporal filtration on the remaining frame area, giving rise to a temporal filtered frame;

performing a spatial filtration on the temporal filtered frame, giving rise to a grain filtered frame;

thereby obtaining a sequence of grain filtered frames constituting the pre-processed video information; and encoding, by the control circuitry, the pre-processed video information.

6. The computerized method according to claim 5, wherein the temporal filtration is performed by: calculating a filtered pixel value for each given pixel in the remaining frame area based on a weighted summation of pixel values of the given pixel in the remaining frame area and at least one corresponding pixel in at least one motion estimated frame of the given frame, giving rise to the temporal filtered frame.

7. The computerized method according to claim 5, wherein the performing a spatial filtration is configured based on one or more grain strength values associated with the given frame.

8. The computerized method according to claim 5, wherein the filtering further comprises calculating the one or more grain strength values associated with the given frame, comprising:

splitting the given frame into one or more luminance intervals based on pixel values thereof; and calculating a grain strength value for each given luminance interval based on variance of blocks within the given interval, giving rise to one or more grain strength values corresponding to the one or more luminance intervals.

9. The computerized method according to claim 5, wherein the detecting area is configured by setting at least one detection threshold to be used to detect areas with bad temporal prediction based on the one or more grain strength values.

10. The computerized method according to claim 5, wherein the detecting comprises:

calculating absolute summation between the given frame and a motion-compensated frame thereof on a per block basis, comparing the absolute summation with at least one detection threshold; and identifying, based on the comparison, one or more poorly predicted blocks to be the areas with bad temporal prediction.

11. The computerized method according to claim 10, wherein the calculating an absolute summation comprises:

calculating difference values between pixels of the given frame and a motion-compensated frame thereof, giving rise to a residual frame;

splitting the residual frame into a plurality of blocks; and calculating an absolute summation for each given block in the residual frame.

12. The computerized method according to claim 11, wherein the absolute summation is a sum of absolute difference values within the given block.

13. The computerized method according to claim 11, wherein the absolute summation is absolute of sum of difference values within the given block.

14. The computerized method according to claim 7, wherein the performing a spatial filtration is further configured by setting one or more following parameters used in the spatial filtration: filter size, filter strength, and edge related parameters.

15. A computerized system of pre-processing video information for optimized video encoding, the system comprising:
an I/O interface configured to receive video information to be encoded, the video information comprising a sequence of video frames;
a control circuitry operatively connected to the I/O interface, the control circuitry comprising a processor and a memory coupled thereto and configured to:
conduct adaptive pre-filtering of the video information, giving rise to pre-processed video information, wherein the conducting comprises, for each given frame of the sequence of video frames:
estimating encoding complexity for one or more blocks in the given frame, the encoding complexity indicative of difference between pixels in the one or more blocks and corresponding prediction of the pixels;
determining a filter strength parameter for the given frame at least based on the encoding complexity;
generating a saliency map for at least a portion of the given frame, the saliency map indicative of one or more areas in the at least a portion each associated with a degree of visual importance; and
adaptively filtering the given frame according to the saliency map using the filter strength parameter, giving rise to a filtered frame;
thereby obtaining a sequence of filtered frames constituting the pre-processed video information; and
encode the pre-processed video information.

16. The computerized system according to claim 15, wherein the determining comprises determining the filter strength parameter using a linear model based on one or more video characteristics of the video information selected from a group comprising: the encoding complexity, bitrate, frame rate, and frame resolution.

17. The computerized system according to claim 15, wherein the determining comprises determining the filter strength parameter using a machine learning model based on one or more video characteristics of the video information selected from a group comprising: the encoding complexity, bitrate, frame rate, and frame resolution.

18. The computerized system according to claim 15, wherein the generating comprises extracting one or more features characterizing the given frame, the one or more features selected from a group comprising: intricateness, gradient, smoothness, grain, face, skin, chroma, level of photo-realism, luminance, and motion of the given frame, and generating the saliency map using the one or more features.

19. A computerized system of pre-processing video information for optimized video encoding, the system comprising:
an I/O interface configured to receive video information to be encoded, the video information comprising a sequence of video frames;
a control circuitry operatively connected to the I/O interface, the control circuitry comprising a processor and a memory coupled thereto and configured to:
filter the video information in order to remove grain content thereof, giving rise to pre-processed video information, wherein the filtering comprises, for each given frame of the sequence of video frames:
obtaining temporal prediction information for the given frame;
detecting areas in the given frame with bad temporal prediction using the temporal prediction information and excluding the detected areas from the given frame, giving rise to a remaining frame area, wherein the detecting areas in the given frame with bad temporal prediction is configured using one or more grain strength values associated with the given frame;
performing a temporal filtration on the remaining frame area, giving rise to a temporal filtered frame; and
performing a spatial filtration on the temporal filtered frame, giving rise to a grain filtered frame;
thereby obtaining a sequence of grain filtered frames constituting the pre-processed video information; and
encode the pre-processed video information.

20. The computerized system according to claim 19, wherein the control circuitry is configured to perform the temporal filtration by: calculating a filtered pixel value for each given pixel in the remaining frame area based on a weighted summation of pixel values of the given pixel in the remaining frame area and at least one corresponding pixel in at least one motion estimated frame of the given frame, giving rise to the temporal filtered frame.

21. The computerized system according to claim 19, wherein the performing a spatial filtration is configured based on one or more grain strength values associated with the given frame.

22. The computerized system according to claim 19, wherein the filtering further comprises calculating the one or more grain strength values associated with the given frame, comprising:
splitting the given frame into one or more luminance intervals based on pixel values thereof; and
calculating a grain strength value for each given luminance interval based on variance of blocks within the given interval, giving rise to one or more grain strength values corresponding to the one or more luminance intervals.

23. The computerized system according to claim 19, wherein the detecting areas are configured by setting at least one detection threshold to be used to detect areas with bad temporal prediction based on the one or more grain strength values.

24. The computerized system according to claim 19, wherein the detecting comprises:
calculating absolute summation between the given frame and a motion-compensated frame thereof on a per block basis,
comparing the absolute summation with at least one detection threshold; and
identifying, based on the comparison, one or more poorly predicted blocks to be the areas with bad temporal prediction.

25. The computerized system according to claim 24, wherein the calculating an absolute summation comprises:
calculating difference values between pixels of the given frame and a motion-compensated frame thereof, giving rise to a residual frame;
splitting the residual frame into a plurality of blocks; and
calculating an absolute summation for each given block in the residual frame.

26. The computerized system according to claim 25, wherein the absolute summation is a sum of absolute difference values within the given block.

27. The computerized system according to claim 25, wherein the absolute summation is the absolute of sum of difference values within the given block.

28. The computerized system according to claim 21, wherein the performing a spatial filtration is further configured by setting one or more of the following parameters used in the spatial filtration: filter size, filter strength, and edge related parameters.

29. A non-transitory computer readable non-volatile storage medium tangibly embodying a program of instructions that, when executed by a computer, causing the computer to perform the method steps of claim 1.

30. A non-transitory computer readable non-volatile storage medium tangibly embodying a program of instructions that, when executed by a computer, causing the computer to perform the method steps of claim 5.

\* \* \* \* \*